United States Patent [19]

Kunkle et al.

[11] Patent Number: 4,838,919
[45] Date of Patent: Jun. 13, 1989

[54] PRETREATMENT OF FUSED CAST REFRACTORIES

[75] Inventors: Gerald E. Kunkle, New Kensington; George A. Pecoraro, Lower Burrell, both of Pa.

[73] Assignee: PPG Industries, Inc., Pittsburgh, Pa.

[21] Appl. No.: 138,748

[22] Filed: Dec. 28, 1987

[51] Int. Cl.$^4$ ............................................. C03B 19/02
[52] U.S. Cl. ..................................... 65/18.1; 65/134; 65/136; 65/374.13; 65/32.1; 501/107
[58] Field of Search ................. 65/18.1, 32, 134, 136, 65/374.13; 501/107

[56] References Cited

U.S. PATENT DOCUMENTS

| | | | |
|---|---|---|---|
| 2,675,323 | 4/1954 | Busby et al. | 501/107 |
| 3,237,254 | 3/1966 | Hanks et al. | 65/32 X |
| 3,437,499 | 4/1969 | Horak et al. | 501/107 |
| 3,473,904 | 10/1969 | Wilson | 65/32 X |
| 3,853,520 | 12/1974 | Rau | 65/DIG. 8 |
| 4,396,572 | 8/1983 | Batigne et al. | 264/510 |
| 4,475,204 | 10/1984 | Brandt et al. | 65/136 X |
| 4,556,526 | 12/1985 | Yajima et al. | 264/60 |
| 4,632,686 | 12/1986 | Brown et al. | 65/18.1 |
| 4,764,198 | 8/1988 | Lythgoe | 65/339 |

*Primary Examiner*—Robert L. Lindsay
*Attorney, Agent, or Firm*—Dennis G. Millman

[57] ABSTRACT

The potential for fused cast ceramic refractories to release stones into molten material with which it is in contact is reduced by subjecting the refractory to a vacuum pretreatment to remove gases from the glassy phase of the refractory. Preferably the treatment is carried out when the refractory is in a molten state.

12 Claims, No Drawings

PRETREATMENT OF FUSED CAST REFRACTORIES

BACKGROUND OF THE INVENTION

This invention relates to fused cast ceramic refractories, and in particular to treatments to reduce erosion of such materials and their tendency to introduce "stone" defects into the product when they are employed as structural members in contact with molten materials. Fused cast ceramics are characterized by methods of manufacture that include melting a mixture of oxides to a molten, amorphous condition, casting the molten mixture into a mold, and as the material cools permitting crystallization to take place within a glassy matrix. The crystalline ceramic phase is highly refractory and the glassy phase helps accommodate thermal expansion. Thus, fused cast ceramics lend themselves to use in high temperatures applications, and in particular where contact with molten material such as molten glass is involved.

The glassy matrix that characterizes the type of ceramic materials with which the present invention deals imparts advantageous properties to the material but also is responsible for a mechanism for failure. Since the glassy phase is less viscous than the crystalline phsae or phases, exudation of the glassy phase from the surface of the refractory over a period of time at operating conditions can occur, thereby accelerating erosion of the surface of the refractory member. The crystalline phases can be selected to have very low rates of dissolution in the molten material in contact with the ceramic, but loss of surface portions of the glassy phase substantially increases the surface area of the crystalline phase that is exposed to the erosive action. Additionally, exudation of the glassy phase increases the frequency with which particles of the crystalline phase are freed from the surface and enter the melt. Because these particles are highly insoluble, they are slow to dissolve and often appear in the final product of the melting process. In glassmaking, these undissolved particles are known as "stones" and are considered highly detrimental to the quality of the glass. Discarding portions of the glass with stones can seriously reduce the productivity of a glassmaking operation. Therefore, it would be highly desirable to provide fused cast ceramic refractory materials that would have greater resistance to glassy phase exudation whereby erosion would be reduced to extend the life of the refractory structure and to reduce the production of stones. The improvements sought would be particularly beneficial in the glass industry, but advantages such as reduced erosion should have applicability to a wide range of applications.

In the prior art, sintering of ceramic materials has employed methods that have similarities to the present invention. But sintering and the problems and objectives of sintering are basically different from fused cast ceramics. Sintering involves molding a mixture of ceramic particles into a desired shape and then heating the molded article until the surfaces of the particles soften sufficiently to bond together. A molten state and phase separation are not involved in sintering. Because sintering involves bonding discrete particles together, a common problem is entrapment of air or other gases in the interstices among the particles. Therefore, sintering is sometimes accompanied by measures to remove gases. Additionally, molding of the article prior to sintering often involves mixing the particles with water or other carrier liquid or organic binders. Removal of these liquids or binders or their decomposition products is another motivation for sintering to involve degassing measures. Providing a special atmosphere is also involved with some sintering techniques for the sake of avoiding oxidation or other unwanted chemical reactions. None of these factors is involved in the production of fused cast refractories since the rendering of the raw materials to the molten state would seem to preclude any concern with interstitial gas entrapment. Also, fused cast materials do not have the relatively high porosity and permeability that characterize sintered materials, so that there has been little concern with the presence of gases in fused cast refractory products.

U.S. Pat. No. 670,299 (Schwarz) involves the imposition of vacuum during a cementitious reaction to prevent air from interfering with the reaction.

U.S. Pat. No. 1,615,022 (McCullogh) discloses baking a ceramic material onto a metal member in vacuum to avoid oxidation and to reduce porosity of the ceramic.

U.S. Pat. No. 1,803,355 (Reichmann) relates to a process for sintering aluminum oxide in vacuum to avoid forming aluminum carbide.

U.S. Pat. No. 2,128,289 (Dubilier) discloses sintering ceramic mixtures in vacuum to prevent deoxidation of titanium dioxide.

U.S. Pat. No. 1,512,801 (Richardson et al.) discloses treating a slip for casting refractory ware in vacuum to remove air bubbles prior to casting and firing.

U.S. Pat. No. 3,859,405 (Horton) involves a process for sintering ceramic articles in which a binder is removed under vacuum during moderate heating prior to sintering.

U.S. Pat. No. 3,343,915 (Rossi et al.) discloses removal of solvent from metal oxide powder by vacuum prior to sintering.

U.S. Reissue Pat. No. 20,460 (Jeffery) involves slip-casting of ceramics in which voids are eliminated by pressing the casting prior to firing.

U.S. Pat. No. 3,954,930 (Vasilos et al.) discloses hot pressing of ceramics under vacuum to remove trapped gases.

U.S. Pat. No. 4,242,294 (Huther et al.) teaches sintering a glass or ceramic coating under vacuum.

U.S. Pat. No. 4,294,788 (Laskow et al.) discloses molding silicon carbide under vacuum to avoid oxidation.

U.S. Pat. No. 4,396,572 (Batigne et al.) discloses de-aerating a ceramic paste under vacuum, and in a separate step uses vacuum to avoid air entrapment when laminating two layers of extruded ceramic paste.

U.S. Pat. No. 4,556,526 (Yajima et al.) involves sintering a semi-inorganic material under inert conditions, which may include vacuum.

U.S. Pat. No. 4,632,686 (Brown et al.) deals with molding and melting a quartz glass article in which vacuum is used to remove air from powdered quartz as it begins to melt so as to eliminate bubbles from the glass product.

SUMMARY OF THE INVENTION

It has been discovered that the glassy phase of fused cast ceramics has gas dissolved or otherwise included therein that exacerbates the exudation of the glassy phase, which in turn worsens the erosion of the material and the production of stones. It has also been discovered that removal of these gases by a vacuum treatment process improves the performance of fused cast ceramic refractories. The vacuum treatment should be at sufficiently low pressure and sufficiently high temperature to remove a substantial portion of the dissolved gases in a reasonable amount of time. Preferably the vacuum treatment is carried out while the material is in a molten state prior to and/or during casting so as to expedite rapid and thorough removal of gases throughout the entire body of the ceramic product. At least partial improvement may be achieved by removing gases from surface portions of a fused cast ceramic piece after casting by subjecting it to vacuum at temperatures sufficiently high to reduce the viscosity of the glassy phase at the surface but not so high as to remelt the ceramic. The rate at which gases diffuse from the glassy phase will vary in accordance with the viscosity of the glassy phase and the amount of vacuum. Therefore the length of vacuum treatment, degree of gas removal, temperature, and pressure are interrelated and may vary in accordance with individual requirements.

When a fused cast ceramic refractory is put into service, it is believed that gases are driven out of solution in the glassy phase at elevated temperature when conditions are encountered that differ from those under which the refractory was made, including different oxidation-reduction conditions, higher temperature, or lower pressures. When the use of the refractory involves temperatures near the upper operating limits for the refractory, the glassy phase may soften sufficiently that the gases migrate through the glassy phase, coalesce into bubbles, and percolate out of the refractory. This gas exsolution activity in the glassy phase is believed to hasten the undesirable exudation of the glassy phase. Such a phenomenon appear to be particularly active under vacuum at glass melting temperatures, and the present invention has substantial potential for improving refractory performance under those conditions. However, the utility of the invention is not limited to that application since improvements of a lesser magnitude are possible for other environments.

DETAILED DESCRIPTION

Fused cast ceramic refractories may include a variety of compositions, and the proportions of glassy and crystalline phases may range considerably. The present invention is not limited to particular compositions since the principles of the invention apply to any ceramic material with a significant glassy phase. An example of a common category of fused cast ceramic refractories that are suitable for use in the present invention are the "AZS" type, comprised chiefly of alumina, zirconia, and silica, with minor amounts of alkali and other metal oxides. AZS refractories typically fall within the following ranges (percent by weight): 40–60% $Al_2O_3$, 25–45% $ZrO_2$, 10–20% $SiO_2$, 1–5% alkali metal oxides and accessory oxides. The benefits of the present invention appear to be related to the glassy phase of fused cast ceramics. Accordingly, the benefits appear to be more pronounced in those ceramics that have a significant glassy phase. Products in which the glassy phase constitutes about six percent by volume of the material exhibit little observable improvement from the vacuum treatment of the present invention. It is believed that for significant improvements to be attained, the amount of glassy phase should be sufficient to be a substantially continuous phase throughout the material. Generally, a continuous glassy phase occurs when the glassy phase constitutes at least eight percent by volume of the material. Theoretically, there is no upper limit for the amount of glassy phase, but retention of refractory properties would generally preclude substantially exceeding twenty-five percent glassy phase by volume. Commercially available AZS fused cast refractories typically have about 13 to 18 percent glassy phase by volume, which is exemplary for application of the present invention.

Maximizing the temperature at which the ceramic material is subjected to the vacuum degassing treatment will maximize the speed and thoroughness of gas removal. Therefore, it is preferred to perform the gas removal step when the ceramic material is in a molten state. The temperature at which the ceramic material is molten will vary in accordance with its composition. By way of example, "Monofrax S-4,", typical AZS refractory commercially available from Sohio Engineered Materials Co., Cleveland, OH, is molten at temperatures of about 3400° F. (1875° C.). In this preferred mode of practicing the invention, the initial melting of the ceramic may be carried out under vacuum, and the treated melt may then be cast into a mold under atmospheric conditions or also under vacuum to provide additional time for gas removal. Alternatively, the ceramic could be melted under atmospheric conditions and then provided with a reduced pressure environment prior to casting, during casting, or immediately after casting. The molten state is highly advantageous for gas removal since the viscosity is sufficiently low to permit formation of bubbles which are free to move to the surface and escape. At higher viscosities the gas removal mechanism may be limited to diffusion. However, in an alternative mode of the invention, the vacuum treatment may be carried out when the ceramic is at elevated temperatures lower then the molten state. An advantage of this technique is that the complexities of melting and casting under vacuum are avoided and a plurality of cast articles may be treated as a group in a single treatment step. The temperature is elevated so as to increase the rate of diffusion, but not so high as to distort or otherwise damage the refractory pieces. An appropriate temperature would be at or slightly above the expected tempertures anticipated for the refractories when put into service. For example, refractories to be used in contact with molten glass would be treated at temperatures around 2600° F. (1425° C. ) up to the upper service temperature limits of the particular refractory product, but preferably below a temperature at which the glassy phase of the refractory is so fluid as to be removed along with the gases. The optimum temperature can be determined by trial and error for a particular refractory product at a particular treatment pressure. If the refractory is intended for use in a vacuum chamber, the degassing treatment may be carried out in situ after the chamber is constructed but before molten material is introduced.

In general, it is desirable for the pressure to be as low as possible during treatment so as to shorten the treatment time. However, any reduction in pressure below atmospheric expedites removal of gases from solution in the glassy phase and is therefore beneficial. Pressures below one half atmosphere are most practical, and pressures of one third atmosphere or less are preferred. Lower pressure have been employed beneficially, but no clear advantage has been found for pressures lower than about one twentieth of an atmosphere. Lower pressures may be disadvantageous if undue loss relatively volatile constituents of the refractory, such as sodium compounds, occurs. If the refractory is to be used in a vacuum environment, it may be desirable to degas the refractory at a pressure comparable to or lower than the lowest pressures expected during use.

The duration of the degassing treatment need be only on the order of a few minutes when the refractory is in the molten state, times of twenty to thirty minutes being typical in successful examples. For formed pieces the treatment times will be considerably longer and will vary in accordance with the temperature and pressures used.

All of the examples given hereinafter involve "Monfrax S-4", an AZS fused cast refractory manufactured by Sohio Engineered Materials Co., Cleveland, Ohio, having the following composition by weight: 47.8% $Al_2O_3$, 36.4% $ZrO_2$, 14.0% $SiO_2$, 1.8% alkali and accessory oxides. In each of the tests described, the material was remelted from scrap refractory material, but it should be understood that the practice of this invention would normally involve initially melting the raw materials for the ceramics. In Examples 1 through 4, crushed refractory material in quantities averaging about 200 grams were melted in a tungsten crucible surrounded by an induction heating coil within a vacuum chamber. The chamber was purged with argon during heating. The samples were heated by means of the induction coil to a temperature at which the refractory was molten and held for a time period at that temperature while vacuum was drawn in the chamber. In Table I the peak temperature portion of the time and temperature schedule is set forth for each example, that being the portion believed to be responsible for most of the degassing. The melts were permitted to cool in the crucibles, with rapid cooling to about 1260° C. and slow cooling to about 925° C. The first example was a control in which the refractory was remelted without the benefit of the vacuum treatment of the present invention (the pressure was somewhat above atmospheric due to the use of the argon purge gas). Example 6 was melted in an induction heated vacuum chamber that permitted pouring of the melt from a larger, pivotably mounted crucible into a sand mold within the vacuum chamber. The crucible was molybdenum inside a ceramic insulating sleeve, and a piece of about 450 grams was cast. Temperature measurements were not available during the melting of Example 6, but heating was carried out until melting was visually observed. Additional unmelted, crushed ceramic materials was added incrementally to the crucible in Example 6 as indicated in Table I.

Performance of the treated samples as to stone formation was tested by immersing a small piece of each sample (about 0.05 gram) in molten soda-lime-silica glass held in an electrically heated plantinum boat holding about 0.3 gram of glass. Simultaneously, a pressure of 7 to 10 torr (absolute) was maintained around the platinum boat and the surface behavior of the treated ceramic piece was observed microscopically. The total number of stones observed in the platinum boat after twenty minutes is set forth in Table I. A piece of untreated Monofrax S-4 was also subjected to the same stone formation test and was observed to yield 5 stones. By comparing with Example 1, which was remelted but not exposed to vacuum, it can be seen that the remelting procedure used in the experiments significantly deteriorated the performance of the refractory. This can be explained by the fact that the small scale, crude technique used did not optimize such factors as porosity, crystalline phase growth, and annealing which would affect durability and integrity. Therefore, to isolate the effect of the vacuum degassing pretreatment in the experiments, it is useful to compare the remainder of the examples in Table I with Example 1, whereby improvement in all of the vacuum examples can be seen. Moreover Examples 2 and Example 5 show improvement even over the unremelted material.

TABLE I

| Example | Temperature (°C.) | Pressure (Torr) (absolute) | Time Lapsed (Minutes) | Stones |
|---|---|---|---|---|
| 1 (Control) | 1205 | 852 | 0 | |
| | 1625 | 850 | 17 | |
| | 1899 | 849 | 29 | |
| | 1899 | 847 | 32 | |
| | 1899 | 867 | 49 | |
| | 1147 | 866 | 65 | 10 |
| 2 | 1316 | 45 | 0 | |
| | 1686 | 36 | 15 | |
| | 1850 | 39 | 21 | |
| | 1899 | 38 | 26 | |
| | 1902 | 44 | 34 | |
| | 1902 | 44 | 47 | |
| | 1415 | 38 | 57 | 2 |
| 3 | 1370 | 13 | 0 | |
| | 1760 | 13 | 16 | |
| | 1911 | 14 | 24 | |
| | 1899 | 14 | 37 | |
| | 1900 | 14 | 54 | |
| | 1471 | 15 | 64 | |
| | 1158 | 15 | 78 | 8 |
| 4 | 1133 | 5 | 0 | |
| | 1508 | 5 | 17 | |
| | 1828 | 5 | 30 | |
| | 1907 | 5 | 35 | |
| | 1903 | 5 | 45 | |
| | 1899 | 5 | 55 | |
| | 1557 | 5 | 63 | |
| | 1159 | 5 | 78 | 4 |
| 5 | Power on | 253 | 0 | |
| | Melted, added material | 253 | 15 | |
| | Melted, added material | 253 | 25 | |
| | Mostly melted | 253 | 37 | |
| | Melted, poured | 253 | 42 | 0 |

The invention has been described with reference to specific examples, but it should be understood that variations and modifications known to those of skill in the art may be resorted to within the scope of the invention defined by the claims which follow.

We claim:

1. A method of treating a fused cast ceramic refractory having a crystalline phase in a substantially continuous glassy phase comprising: subjecting the refractory to pressure below atmospheric while at an elevated temperature sufficient to reduce the viscosity of the glassy phase to permit transport of gas through the glassy phase to extract gas from the glassy whereby subsequent exudation of the glassy phase from the cast refractory is reduced.

2. The method of claim 1 wherein the pressure is less than one half atmospheric pressure.

3. The method of claim 2 wherein the temperature is at least 2600° F. (1425° C.).

4. The method of claim 1 wherein the refractory is in a molten state while subjected to the pressure below atmospheric.

5. The method of claim 4 wherein the pressure is less than one half atmospheric pressure.

6. The method of claim 4 wherein the refractory is fused while under pressure below atmospheric.

7. The method of claim 4 wherein the refractory is cast while under pressure below atmospheric.

8. The method of claim 1 wherein the refractory is an alumina-zirconia-silica type.

9. The method of claim 8 wherein the refractory comprises 40–60 percent by weight alumina, 25–45 percent by weight zirconia, and 10–20 percent by weight silica.

10. The method of claim 8 wherein the refractory is in a molten state while being subjected to pressure below atmospheric.

11. The method of claim 10 wherein the pressure is less than one half atmospheric pressure.

12. A method of preparing a refractory-lined vacuum chamber comprising: lining the chamber with a ceramic refractory material having a crystalline phase in a substantially continuous glassy phase, heating the chamber interior to an elevated temperature approaching the deformation temperature of the glassy phase so as to permit transport of gas through the glassy phase, subjecting the refractory to a pressure below atmospheric while at the elevated temperature so as to remove gas from the refractory material, and introducing molten glass into the chamber in contact with at least a portion of the refractory lining.

* * * * *

UNITED STATES PATENT AND TRADEMARK OFFICE
CERTIFICATE OF CORRECTION

PATENT NO. : 4,838,919
DATED : June 13, 1989
INVENTOR(S) : Gerald E. Kunkle and George A. Pecoraro It is certified that error appears in the above-identified patent and that said Letters Patent is hereby corrected as shown below:

Claim 1, line 7, insert --phase-- after second occurrence of "glassy".

Signed and Sealed this

Thirty-first Day of July, 1990

Attest:

HARRY F. MANBECK, JR.

Attesting Officer      Commissioner of Patents and Trademarks